United States Patent [19]
Laughman et al.

[11] Patent Number: 5,783,312
[45] Date of Patent: Jul. 21, 1998

[54] EXPANDED METAL STRIP FOR REINFORCING A RESILIENT PRODUCT

[75] Inventors: Kerry L. Laughman, Huber Heights; Terry R. Suitts, Englewood; Daniel J. Davis, Beavercreek; Robert W. Davis, Xenia, all of Ohio

[73] Assignee: The Gem City Engineering Co., Dayton, Ohio

[21] Appl. No.: 772,030

[22] Filed: Dec. 19, 1996

[51] Int. Cl.[6] .................................................. E06B 7/22
[52] U.S. Cl. ..................... 428/573; 428/595; 428/596; 428/600; 428/122; 428/136; 428/138; 428/140; 29/6.1; 49/490.1
[58] Field of Search ................................ 428/122, 596, 428/573, 600, 595, 136, 138, 140; 49/490.1, 498.1; 29/6.1

[56] References Cited

U.S. PATENT DOCUMENTS

| | | | |
|---|---|---|---|
| 4,304,816 | 12/1981 | Bright et al. | 49/490.1 |
| 5,199,142 | 4/1993 | Davis | 29/6.1 |
| 5,302,466 | 4/1994 | Davis | 428/573 |

*Primary Examiner*—Alexander Thomas
*Attorney, Agent, or Firm*—Jacox, Meckstroth & Jenkins

[57] ABSTRACT

A continuous strip of sheet metal is progressively lanced and then expanded by coining rolls to form an expanded ladder-like reinforcing strip. The strip has laterally extending parallel spaced bars integrally connected on one side by a coined solid spline and on the other side by a coined spline lanced to form slits at longitudinally spaced intervals. The strip is roll-formed into a U-shaped channel which is fed into an extruder head for reinforcing an extruded resilient weatherstrip having a tubular portion projecting from the embedded continuous solid spline and a retaining wall portion reinforced with the embedded lanced spline.

20 Claims, 1 Drawing Sheet

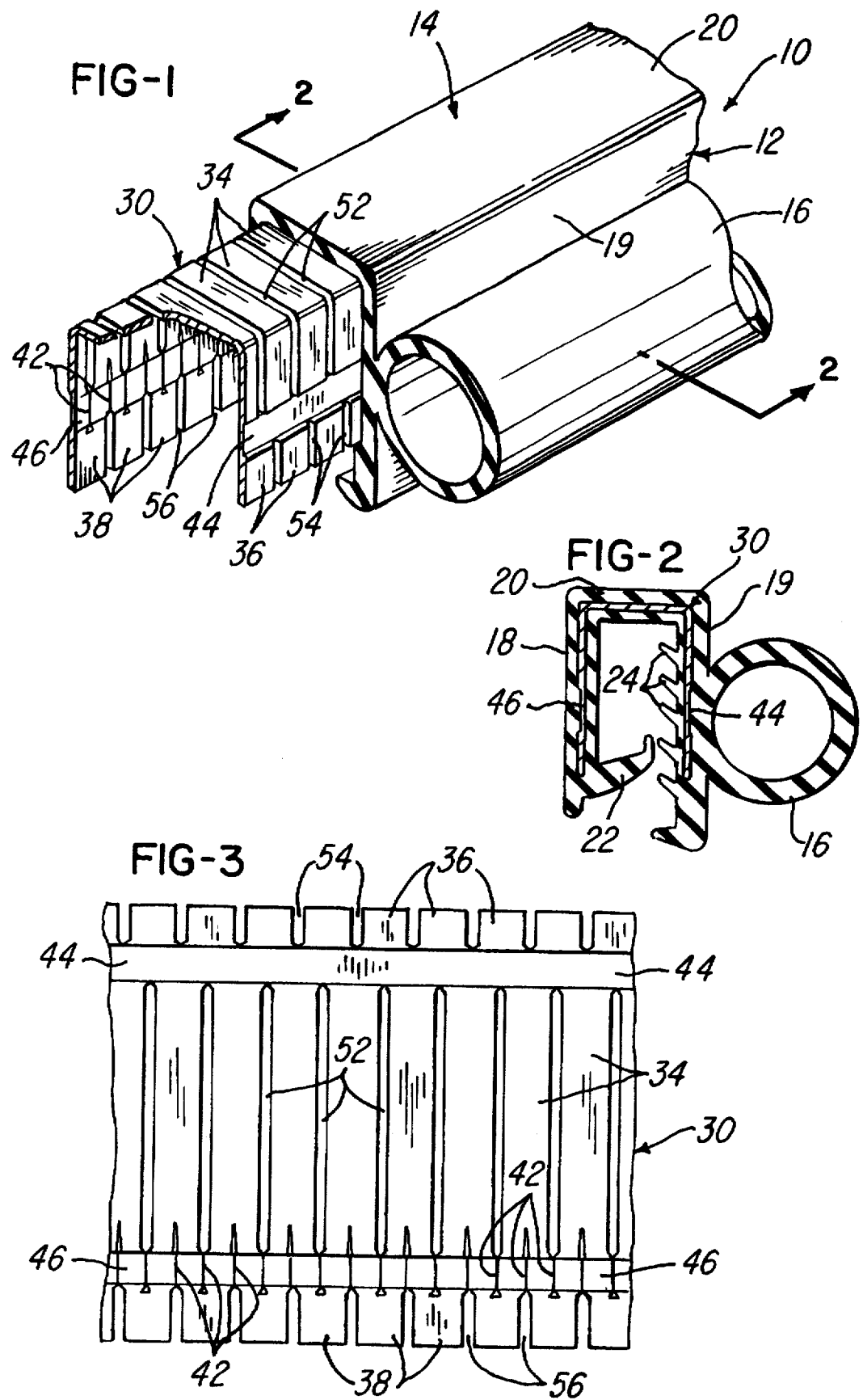

EXPANDED METAL STRIP FOR REINFORCING A RESILIENT PRODUCT

BACKGROUND OF THE INVENTION

In the production of rubber or rubber-like weatherstrips of the type commonly used on motor vehicles around doors, windows and trunk covers, it is common to reinforce each weatherstrip with an embedded formed expanded metal strip. The strip is continuously fed through an extruder head having a die for extruding the weatherstrip with the desired cross-sectional configuration. Examples of continuous reinforcing strips are disclosed in U.S. Pat. No. 5,199,142 and U.S. Pat. No. 5,302,466 which issued to the assignee of the present invention. These patents disclose different forms of expanded sheet metal strips having single diamond shaped or double diamond shaped longitudinally spaced openings or apertures and defining longitudinally spaced V-shaped tabs forming opposite edge portions of the strips.

Another form of continuous reinforcing strip which has been used is in the form of a serpentine-shaped continuous wire to which is stitched longitudinally extending thread-like filaments. A further form of metal reinforcing strip is commonly referred to as the "ladder-type" expanded metal strip which has parallel spaced and laterally extending bars and projecting edge tabs. The bars and tabs are formed by lancing a sheet metal strip with laterally extending parallel spaced slits which are interrupted by two longitudinally extending parallel splines. The splines are compressed between coining rolls which expands the strip longitudinally to define slots between the parallel spaced bars and with the splines having a thickness less than the thickness of the sheet metal strip or bars.

The flat ladder-type expanded metal reinforcing strip is then fed into a rubber extruder head so that the strip is embedded within the rubber weatherstrip. The flat extruded rubber portion with the embedded metal reinforcing strip is then fed through a roll-forming machine which forms the reinforced rubber portion into a U-shaped channel. After or while the rubber channel portion of the weatherstrip is being formed, the channel portion of the reinforcing strip is distorted to break one or both of the splines between adjacent bars so that the bars become independent and disconnected reinforcing segments within the channel portion of the weatherstrip.

In the construction and use of the ladder-type reinforcement within a weatherstrip, it is difficult to roll-form the reinforcing strip into a precision channel-shaped configuration after the strip has been embedded into the rubber extrusion in order to obtain a weatherstrip having a precisely uniform cross-sectional configuration. It is also necessary to have sufficient rubber material overlying the metal reinforcing strip so that the rubber does not tear and expose the reinforcing strip when the reinforced flat portion of the weatherstrip is roll-formed into a U-shaped channel configuration. With weatherstrips having an extruded tubular portion, it has also been found desirable to have a continuous spline of the reinforcing strip adjacent the tubular portion in order to prevent collapsing and/or distortion of the tubular portion when the weatherstrip is formed to fit a plain curve or compound curve on a motor vehicle opening.

SUMMARY OF THE INVENTION

The present invention is directed to an improved expanded metal strip for reinforcing a resilient product, its method of production and the improved reinforced resilient product. In accordance with one embodiment of the invention, a continuous strip of sheet metal is progressively lanced to form laterally extending slits at longitudinally intervals, and the strip is then fed through coining rolls which form longitudinally extending splines integrally connecting longitudinally spaced and laterally extending parallel spaced bars. The longitudinally spaced slits extend through one of the splines to form longitudinally spaced tabs which form one edge portion of the strip and have U-shaped portions integrally connecting the parallel spaced bars in a serpentine manner. The other spline is preferably solid and continuous, and longitudinally spaced tabs project laterally from the continuous solid spline to form the opposite edge portion of the strip.

The expanded sheet metal strip is then roll-formed into a precision U-shaped channel which is fed in a continuous manner through an extruder head which forms a resilient product or weatherstrip with the expanded metal channel-shaped strip embedded within the weatherstrip. When the weatherstrip includes a tubular sealing portion, the continuous spline of the reinforcing strip is located adjacent the tubular portion, and the other interrupted spline with the longitudinally spaced slits is located within the outer retaining portion of the weatherstrip. As a result, the reinforced weatherstrip is ideally suited for bending around curves without significantly distorting the tubular sealing portion.

Other features and advantages of the invention will be apparent from the following description, the accompanying drawing and the appended claims.

BRIEF DESCRIPTION OF THE DRAWINGS

FIG. 1 is a fragmentary prospective view of a weatherstrip reinforced by an expanded metal insert strip constructed in accordance with the invention;

FIG. 2 is a section of the weatherstrip taken generally on the lines 2—2 of FIG. 1; and FIG. 3 is a fragmentary plan view of the metal reinforcing strip after it is expanded but before forming into the channel shown in FIG. 1.

DESCRIPTION OF THE PREFERRED EMBODIMENT

FIG. 1 illustrates a typical reinforced weatherstrip 10 having an extruded rubber or rubber-like body 12 formed by a channel-shaped portion 14 and a resilient and flexible bulbous or tubular portion 16. The channel portion 14 includes an outer wall 18 and an inner parallel wall 19 connected by a top wall 20. The outer wall 18 includes an integrally formed retaining rib or flange 22, and the inner wall 19 has a plurality of parallel spaced inclined retaining ribs 24. If desired, the body 12 may be extruded with a dual durometer with the channel portion 14 having a higher durometer than the resilient tubular portion 16 or with the retaining flange 22 having a higher durometer than the channel portion 14.

In accordance with the present invention, the body 12 is reinforced with a continuous and longitudinally extending expanded sheet metal reinforcing strip 30 which is fed into the extruder head to form an embedded reinforcing insert within the channel portion 14 of the body 12. As shown in FIG. 3, the expanded sheet metal strip 30 is produced by first cutting or lancing a strip of thin sheet metal with longitudinally spaced and laterally extending slits which define parallel spaced and laterally extending bars 34 and opposite edge tabs 36 and 38. The strip is also lanced to form longitudinally spaced and laterally extending slits 42 which extend from the edge tabs 38.

After the sheet metal strip is lanced to define the bars 34, edge tabs 36 and 38 and including the slits 42, the strip is fed between two sets of pinch or coining rolls such as shown in FIG. 9 of above-mentioned U.S. Pat. No. 5,302,466, the disclosure of which is incorporated by reference. The coining rolls compress the metal or steel strip to form longitudinally extending and parallel spaced splines including an inner solid and continuous spline 44 and an outer spline 46 which is interrupted by the laterally extending slits 42. When the sheet metal strip is compressed or coined along the splines 44 and 46, for example from 0.020 inch to 0.012 inch, the laterally extending slits form longitudinally spaced slots 52 between the bars 34 and the slots 54 and 56 between the tabs 36 and 38, respectively.

The compressed thinner spline 46 is interrupted by the slits 42 within the spline, but each tab 38 integrally connects adjacent segments of the spline 46 and forms an integral connection of the adjacent bars 34 which are straddled by the tab 38. Thus the slits 42, which interrupt the spline 46, substantially reduce the resistance to tension of the spline 46 in comparison to the tension of the solid continuous spline 44. For example, the spline 44 may offer a tension resistance of 160 pounds whereas the tension resistance of the interrupted spline 46 may be 45 pounds, over which the spline 46 begins to stretch with the lanced slits 42 forming corresponding slots.

As mentioned above, the expanded sheet metal strip shown in FIG. 3 is roll-formed into the channel-shaped strip 30 shown in FIGS. 1 and 2 before the strip is fed into the extruder head to receive the extruded rubber body 12 which extends through the slots 52, 54 and 56. As also shown in FIGS. 1 and 2, the channel-shaped strip 30 is oriented or positioned so that the continuous spline 44 is located directly under or adjacent the tubular portion 16 of the body 12 while the interrupted spline 46 is located within the outer wall 18 of the body 12. As a result, the continuous spline 44 helps maintain the uniform configuration of the tubular portion 16 without any kinks or distortion while the outer wall 18 of channel portion 14 is stretched around curves within the receiving channel portion (not shown) extending around a door or trunk opening within a vehicle body.

Thus the construction of the expanded metal reinforcing strip 30 provides for bending the weatherstrip 10 around tight curves and corners with minimum distortion of the tubular portion 16. That is, the outer wall 18 of the weatherstrip 10 may stretch relative to the inner wall 19 with corresponding stretching of the spline 46. However, since the tabs 38 and the segments of the spline 46 form a serpentine-like continuous and expandable connection of the bars 34, the rubber wall 18 stretches uniformly and is prevented from tearing when the wall is stretched around a curve. The serpentine connection of the bars 34 by the tabs 38 and spline segments also provides for precise roll-forming of the flat expanded sheet metal strip into the channel-shaped strip 30 before the strip 30 is fed into an extruder head. The precision formed channel-shaped strip 30 may also be fed more accurately into the rubber extrusion head in order to locate the strip 30 precisely within the walls 18-20 forming the channel portion 14 of the body 12.

While the expanded metal reinforcing strip 30 and its method of production herein described constitute a preferred embodiment of the invention, it is to be understood that the invention is not limited to the precise strip and method described, and that changes may be made therein without departing from the scope and spirit of the invention as defined in the appended claims.

The invention having thus been described, the following is claimed:

1. An elongated expanded sheet metal strip adapted for reinforcing a resilient weatherstrip product, comprising a continuous series of longitudinally spaced and laterally extending sheet metal bars, a set of first and second longitudinally extending and parallel spaced splines integrally connecting said bars, each of said splines having a thickness less than the thickness of said bars, said first spline having longitudinally spaced and laterally extending slits interrupting said first spline, and said slits are arranged to provide for stretching said first spline while maintaining an integral connection of said bars by said first spline.

2. A strip as defined in claim 1 wherein said second spline is continuous and uninterrupted.

3. A strip as defined in claim 1 and including a continuous series of longitudinally spaced sheet metal tabs integrally connected to said bars and said splines and projecting laterally outwardly from each of said splines to form the opposite edge portions of said strip.

4. A strip as defined in claim 3 wherein said tabs projecting laterally outwardly from said first spline integrally connect adjacent separate segments of said first spline as defined between said slits.

5. A strip as defined in claim 1 wherein at least some of said slits within said first spline are generally aligned laterally with spaces defined between said longitudinally spaced bars.

6. A strip as defined in claim 1 wherein at least some of said slits within said first spline are generally aligned laterally with center portions of said bars and extend into said bars.

7. A strip as defined in claim 1 wherein said second spline is continuous and uninterrupted and in combination with an extrusion of resilient material encasing said strip, and said extrusion includes a hollow tubular portion projecting from said second spline.

8. A strip as defined in claim 1 and forming a U-shape reinforcing channel embedded within an extrusion of resilient material, and said extrusion includes a hollow tubular portion projecting laterally from said second spline.

9. An elongated expanded sheet metal strip adapted for reinforcing a resilient weatherstrip product, comprising a continuous series of longitudinally spaced and laterally extending sheet metal bars, a set of first and second longitudinally extending and parallel spaced splines integrally connecting said bars, each of said splines having a thickness less than the thickness of said bars, a continuous series of longitudinally spaced sheet metal tabs integrally connected to said bars and said splines and projecting laterally outwardly from each of said splines to form the opposite edge portions of said strip, said first spline having longitudinally spaced and laterally extending slits interrupting said first spline, and said slits and said tabs projecting from said first spline cooperating to provide for stretching said first spline while maintaining an integral connection of said bars by said first spline.

10. A strip as defined in claim 9 wherein said second spline is continuous and uninterrupted.

11. A strip as defined in claim 9 wherein said tabs projecting from said first spline integrally connect adjacent separate segments of said first spline as defined between said slits.

12. A strip as defined in claim 9 wherein at least some of said slits within said first spline are generally aligned laterally with spaces defined between said longitudinally spaced bars.

13. A strip as defined in claim 9 wherein at least some of said slits within said first spline are generally aligned laterally with center portions of said bars and with slots defined between said tabs projecting from said first spline.

14. A strip as defined in claim 9 wherein said second spline is continuous and uninterrupted and in combination with an extrusion of resilient material encasing said strip, and said extrusion includes a hollow tubular portion projecting from said second spline.

15. A strip as defined in claim 9 and forming a U-shape reinforcing channel embedded within an extrusion of resilient material, and said extrusion includes a hollow tubular portion projecting laterally from said second spline.

16. A method of producing an elongated expanded sheet metal strip adapted for reinforcing a resilient weatherstrip product, comprising the steps of lancing a strip of sheet metal to define a continuous series of laterally extending sheet metal bars, coining the strip to form first and second longitudinally extending and parallel spaced splines having a thickness less than the thickness of the bars and to expand the strip longitudinally to form spaces between the bars, lancing the first spline to form longitudinally spaced and laterally extending slits interrupting the first spline, and arranging the slits to provide for stretching the first spline while maintaining an integral connection of the bars by the first spline.

17. A method as defined in claim 16 and including the steps of lancing the strip to form a continuous series of longitudinally spaced sheet metal tabs integrally connected to the bars and splines and projecting laterally outwardly from each of the splines to form the opposite edge portions of the strip.

18. A method as defined in claim 16 and including the step of generally aligning the slits within the first spline laterally with spaces defined between the longitudinally spaced bars.

19. A method as defined in claim 16 wherein the second spline is continuous and uninterrupted, and encasing the expanded metal strip with an extrusion of resilient material forming a hollow tubular portion projecting from the second spline.

20. A method as defined in claim 16 and including the steps of roll-forming the strip into a U-shape reinforcing channel, and encasing the strip with an extrusion of resilient material.

* * * * *